(12) United States Patent
Dettinger et al.

(10) Patent No.: US 8,086,574 B2
(45) Date of Patent: *Dec. 27, 2011

(54) USAGE-BASED OPTIMIZATION OF NETWORK TRAFFIC AND DATA WAREHOUSE SIZE

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 609 days.

This patent is subject to a terminal disclaimer.

(21) Appl. No.: 12/106,641

(22) Filed: Apr. 21, 2008

(65) Prior Publication Data

US 2008/0228711 A1 Sep. 18, 2008

Related U.S. Application Data

(63) Continuation of application No. 10/388,075, filed on Mar. 13, 2003, now Pat. No. 7,627,597.

(51) Int. Cl.
*G06F 17/00* (2006.01)
(52) U.S. Cl. ......... 707/688; 707/687; 707/736; 707/741
(58) Field of Classification Search .................. 707/688, 707/687, 736, 741
See application file for complete search history.

(56) References Cited

U.S. PATENT DOCUMENTS

| 6,170,037 | B1 | 1/2001 | Blumenau |
| 6,345,288 | B1 | 2/2002 | Reed et al. |
| 6,442,557 | B1 | 8/2002 | Buteau et al. |
| 6,591,288 | B1 * | 7/2003 | Edwards et al. ............... 709/203 |
| 6,601,173 | B1 * | 7/2003 | Mohler .............................. 726/7 |
| 6,725,227 | B1 | 4/2004 | Li |
| 6,778,982 | B1 * | 8/2004 | Knight et al. .................. 707/737 |
| 6,785,671 | B1 * | 8/2004 | Bailey et al. ............... 705/26.81 |
| 6,996,558 | B2 | 2/2006 | Dettinger et al. |
| 2002/0042841 | A1 * | 4/2002 | Nishio et al. .................. 709/245 |
| 2004/0148276 | A1 * | 7/2004 | Dettinger et al. ................. 707/3 |
| 2004/0181509 | A1 | 9/2004 | Dettinger et al. |

* cited by examiner

*Primary Examiner* — Mahesh Dwivedi
(74) *Attorney, Agent, or Firm* — Patterson & Sheridan LLP; Grant A. Johnson

(57) ABSTRACT

The present invention generally provides systems, methods, and articles of manufacture for maintaining a data warehouse having a plurality of fields updated with data from one or more data sources. Rather than automatically update every field of data available in the warehouse, a limited subset of fields identified through their involvement in queries issued against the warehouse are updated. By limiting the fields that are updated, the network bandwidth required to transmit the updates to the data warehouse may be reduced. Further, by removing fields from the data warehouse that are not in use, the size of the data warehouse may be reduced.

7 Claims, 6 Drawing Sheets

FIG. 2B

| DATA REPOSITORY ABSTRACTION | 148 |

208₁
Field
 Name = "First Name" — 210₁
 Access Method = "Simple" — 212₁
  Table = "contact"
  Column = "f_name"
 Last Use = today — 215₁

208₂
Field
 Name = "Last Name" — 210₂
 Access Method = "Simple" — 212₂
  Table = "contact"
  Column = "l_name"
 Last Use = today — 215₂

208₃
Field
 Name = "City" — 210₃
 Access Method = "Filtered" — 212₃
  Table = "contact"
  Column = "city"
 Last Use = today — 215₃

208₄
Field
 Name = "Street" — 210₄
 Access Method = "Simple" — 212₄
  Table = "contact"
  Column = "street"
 Last Use = 50 days — 215₄

208₅
Field
 Name = "Birthdate" — 210₅
 Access Method = "Simple" — 212₅
  Table = "contact"
  Column = "dob"
 Last Use = today — 215₅

208₆
Field
 Name = "Age In Years" — 210₆
 Access Method = "Composed" — 212₆
  Expression = Years(Birthdate)
 Last Use = 60 days — 215₆

208₇
Field
 Name = "Age In Decades" — 210₇
 Access Method = "Composed" — 212₇
  Expression = Years(Birthdate)/10
 Last Use = 60 days — 215₇

USAGE-BASED OPTIMIZATION OF NETWORK TRAFFIC AND DATA WAREHOUSE SIZE

CROSS REFERENCE TO RELATED APPLICATIONS

This application is a continuation of U.S. patent application Ser. No. 10/388,075, filed Mar. 13, 2003 now U.S. Pat. No. 7,627,597, which is herein incorporated by reference in its entirety.

BACKGROUND OF THE INVENTION

1. Field of the Invention

The present invention generally relates to data processing and more particularly to maintaining a data warehouse containing fields of data originating from one or more data sources.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Historically, the creation of even relatively simple queries required intimate knowledge of both the database and the underlying query language and, therefore, typically required the assistance of a database expert. However, recent advances in database technology have made it relatively easy for non-expert users to build complex queries designed to return required data. These advances have given rise to a number of new problems, however. For example, by making the database easy to access, the likelihood that many people will be running queries is increased, which may create a heavy load on system resources. As an illustration, at a large healthcare research facility, literally thousands of users may have the ability to run queries at any given time, placing a large demand on a server running the database against which the queries are run. Such a demand may prevent or slow daily transactions accessing the same database (entering/updating patient records, test results, etc.).

One approach to prevent this demand from crippling daily operations involving such transactions is to replicate data from database servers used for daily operations to a data warehouse dedicated to receiving research queries. One challenge to this approach is to determine which data should be replicated. Because it may be very difficult to determine what data is important (i.e., likely to be queried) and what data is not important, every possible queryable field may be replicated to the data warehouse. However, because the data warehouse may accept data from a number of different data sources, the data warehouse may have to be prohibitively large in order to grow at a rate to keep up with the growth of all these sources combined. Further, as the sources grow, replicating data from each source may place a tremendous strain on a network as updates are sent to keep the data warehouse current.

Accordingly, there is a need for an improved method for maintaining a data warehouse of replicated data, such that network traffic and the size of the data warehouse are optimized.

SUMMARY OF THE INVENTION

The present invention generally provides methods, articles of manufacture and systems for maintaining a data warehouse.

For some embodiments, a method for maintaining a data warehouse having a plurality of fields for storing data from one or more data sources generally includes monitoring queries issued against the data warehouse and selectively updating the data warehouse with data, from one or more of the data sources, for a limited subset of fields involved in the monitored queries.

For some embodiments, a method for maintaining a data warehouse generally includes receiving updates for a plurality of fields of the data warehouse, the updates comprising data from one or more data sources, monitoring queries issued against the data warehouse, identifying, based on the monitored queries, one or more fields of the data warehouse that have not been involved in queries for a predetermined time period, and sending a request to discontinue receiving updates for the identified fields.

For some embodiments, the article of manufacture generally includes a computer-readable medium containing a program which, when executed by a processor, performs operations for maintaining a data warehouse. The operations generally include monitoring queries issued against the data warehouse and selectively updating the data warehouse with data, from one or more of the data sources, for a limited subset of fields involved in the monitored queries.

For some embodiments, the system generally includes a data warehouse comprising fields of data containing data originating from one or more data sources, one or more applications configured to issue queries against the data warehouse, and a warehouse manager. The warehouse manager is generally configured to limit the number of fields of the data warehouse that are updated with data from the one or more data sources based on usage of the fields in queries issued against the data warehouse.

For some embodiments, the system generally includes a data warehouse comprising physical fields of data containing data originating from one or more data sources, a data repository abstraction component comprising logical fields mapped to corresponding physical fields of the data warehouse, one or more applications configured to issue abstract queries against the data warehouse, the abstract queries based on logical fields of the data repository abstraction component, and a warehouse manager. The data warehouse is generally configured to monitor the involvement of the logical fields in abstract queries issued by the one or more applications and limit the number of physical fields of the data warehouse that are updated with data from the one or more data sources, based on the monitored involvement.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2B illustrates an exemplary abstract query and data repository abstraction component according to one embodiment of the present invention.

DETAILED DESCRIPTION OF THE PREFERRED EMBODIMENTS

Figure 1:
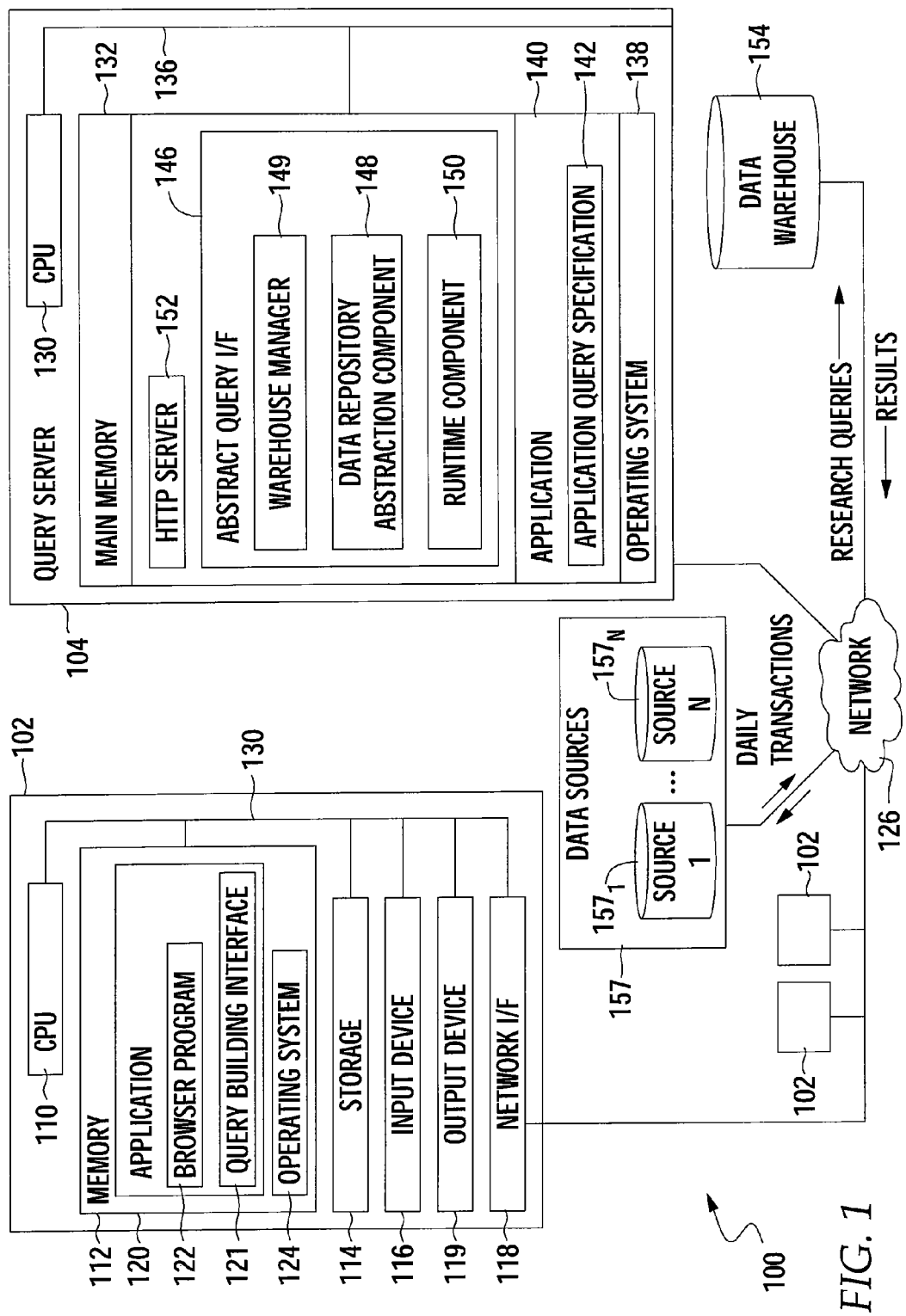
FIG. 1 is a computer system illustratively utilized in accordance with the present invention.

The present invention generally is directed to systems, methods, and articles of manufacture for maintaining a data warehouse having a plurality of fields updated with data from one or more data sources. Rather than automatically update every field of data available in the warehouse, a limited subset of fields identified through their involvement in queries issued against the warehouse are updated. By limiting the fields that are updated, the network bandwidth required to transmit the updates to the data warehouse may be reduced. Further, by removing fields from the data warehouse that are not in use, the size of the data warehouse may be reduced. Fields that are identified as not in use and that are, therefore, not updated and/or removed from the data warehouse are referred to herein as having "fallen out" (e.g., as having fallen out of use and, if removed, as having fallen out of the data warehouse). Data for fields that have previously fallen out may be reloaded into the data warehouse if there is renewed interest in the field (as evidenced by their involvement in a query). By allowing data to be loaded into the data warehouse and removed based on the usage of that data, the data warehouse can be regarded as a living data store which modifies and reconfigures itself as needed over time to satisfy the queries that are run against it.

According to some embodiments, a warehouse manager requests updates to the data warehouse fields from the one or more data sources. Therefore, to limit the number of fields that are updated, the warehouse manager simply does not request updates for fields that have fallen out. According to other embodiments, the data warehouse receives automatically generated updates from the one or more data sources. Therefore, to limit the number of fields that receive updates, the warehouse manager sends one or more "fallout" requests to the data sources to discontinue sending updates for fields that have fallen out.

In one embodiment of the present invention, users are presented with an abstract (logical) model of the data contained in the warehouse. This data abstraction model (DAM) is implemented as a data repository abstraction (DRA) component containing a collection of abstract representations of fields of data contained in the warehouse. Thus, the DRA component provides a logical view of the underlying warehouse. In this way, the data abstraction model may be thought of as a layer that resides over the warehouse, allowing access to generate "abstract" queries against the data warehouse without requiring direct knowledge of its underlying physical properties. A runtime component (e.g., a query execution component) performs translation of abstract queries (generated based on the data abstraction model) into a form that can be used against a particular physical data representation.

The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety. While the data abstraction model described herein provides one or more embodiments of the invention, persons skilled in the art will recognize that the concepts provided herein can be implemented without such a data abstraction model while still providing the same or similar results.

Exemplary Application Environment

Embodiments of the present invention may be applied in a wide variety of environments, particularly environments where research is conducted on data generated by (or extracted from) daily transactions. For example, in a medical research environment (e.g., a research hospital), daily transactions may include creating/updating patient records containing demographic information, medical diagnoses, test results, etc. These patient records may then be queried by medical researchers. As another example, in a manufacturing environment daily transactions may include creating/updating customer records and sales orders records, which may then be queried by market researchers. As still another example, in the airline industry daily transactions may include creating/updating passenger itineraries which may then be queried by researchers to determine flight schedules, set fares, etc.

In either environment, to prevent a large number of research queries from disrupting the daily transactions which are vital to the daily business operations of the entity, data from one or more data sources accessed for the daily transactions may be replicated to another data store (herein referred to as a data warehouse) generally dedicated to processing the research queries. FIG. 1 shows an exemplary networked computer system 100, in which embodiments of the present invention may be utilized, that illustrates the use of a data warehouse 154. Embodiments of the present invention may be implemented as a program product for use with the system 100, to maintain the data warehouse 154 (e.g., to control and limit the replication of data from one or more data sources 157 to the data warehouse 154).

The program(s) of the program product defines functions of the embodiments (including the methods described herein)

and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

As illustrated in FIG. 1, the system 100 generally includes a client (e.g., user's) computer 102 (three such client computers 102 are shown) and at least one server 104. The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server 104 via the network 126. For example, the network interface device 118 may be a network adapter or other network interface card (N IC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any program (preferably GUI-based) capable of rendering the information transmitted to the client computer 102 from the server 104. For some embodiments, the browser program 122 may enable a user to conduct database transactions (e.g., build and issue queries against the data warehouse 154) with the server 104, for example, via one or more GUI screens that form a query building interface 121.

The server 104 may be physically arranged in a manner similar to the client computer 102. Accordingly, the server 104 is shown generally comprising a CPU 130, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the server 104. When read and executed by one or more processors 130 in the server 104, the applications 140 and the abstract query interface 146 cause the computer system 100 to perform the steps necessary to execute steps or elements embodying the various aspects of the invention.

The Data Warehouse

The applications 140 (and more generally, any requesting entity, including the operating system 138 and, at the highest level, users) issue queries against a data warehouse 154. As previously described, one of more of the applications 140 and/or the abstract query interface 146 may interact with various software components of the client 102, such as the browser program 122, allowing the client 102 to issue queries against the data warehouse 154. While, the data warehouse 154 is shown as a separate networked storage device, for some embodiments, the data warehouse 154 may actually reside in the same machine as the server 104.

As previously described, daily transactions may be conducted against one or more data sources 157 (shown as a collection of one or more individual data sources 157₁ ... 157_N). In an effort to prevent research queries issued against the data sources 157 from affecting these daily transactions, data from the data sources 157 may be replicated to the data warehouse 154, which may be generally dedicated to processing the research queries. As illustrated, the abstract query interface 146 may include a warehouse manager 149, generally configured to manage the replication of data from the data sources 157 to the data warehouse 154. As will be described in greater detail below, the warehouse manager 149 may limit the number of fields of the data warehouse 154 that are updated with data from the data sources 157, based on usage of the fields in queries issued against the data warehouse 154.

The data sources 157 and data warehouse 154 are representative of any collection of data regardless of the particular physical representation. By way of illustration, the data sources 157 and the data warehouse 154 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed/executed using logical fields defined by the abstract query interface 146.

In one embodiment, elements of a query are specified by a user through the query building interface 121 which may be implemented as a set of GUI screens. The content of the GUI screens may be generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the server process 152 may respond to requests to access the database(s) 156, which illustratively resides on the server 104. Incoming client requests for data from a database 156 invoke an application 140. When executed by the processor 130, the application 140 causes the server 104 to perform the steps or elements embodying the various aspects of the invention, including accessing the database(s) 156. In one embodiment, the application 140 comprises a plurality of servlets configured to build GUI elements, which are then rendered by the browser program 122.

FIG. 1 is merely one hardware/software configuration for the networked client computer 102 and server 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Data Warehouse Management

As described above, the warehouse manager 149 may be generally configured to manage the replication of data from the data sources 157 to the data warehouse 154. For some embodiments, the warehouse manager 149 may monitor the abstract queries issued by the application 140 and executed by the runtime (query execution) component 150 in order to determine which fields of the data warehouse 154 are currently in use (e.g., a field may be referred to as in use if it is involved in query conditions and/or query results). The warehouse manager 149 may limit updates to the data warehouse 154 to fields that are determined to be in use based on the monitored queries. In other words, the warehouse manager 149 may ensure that fields that have fallen out of use are not updated. For some embodiments, in performing warehouse maintenance, the warehouse manager 149 may update and/or access usage characteristics for fields stored in the DRA component 148.

Figure 2A:
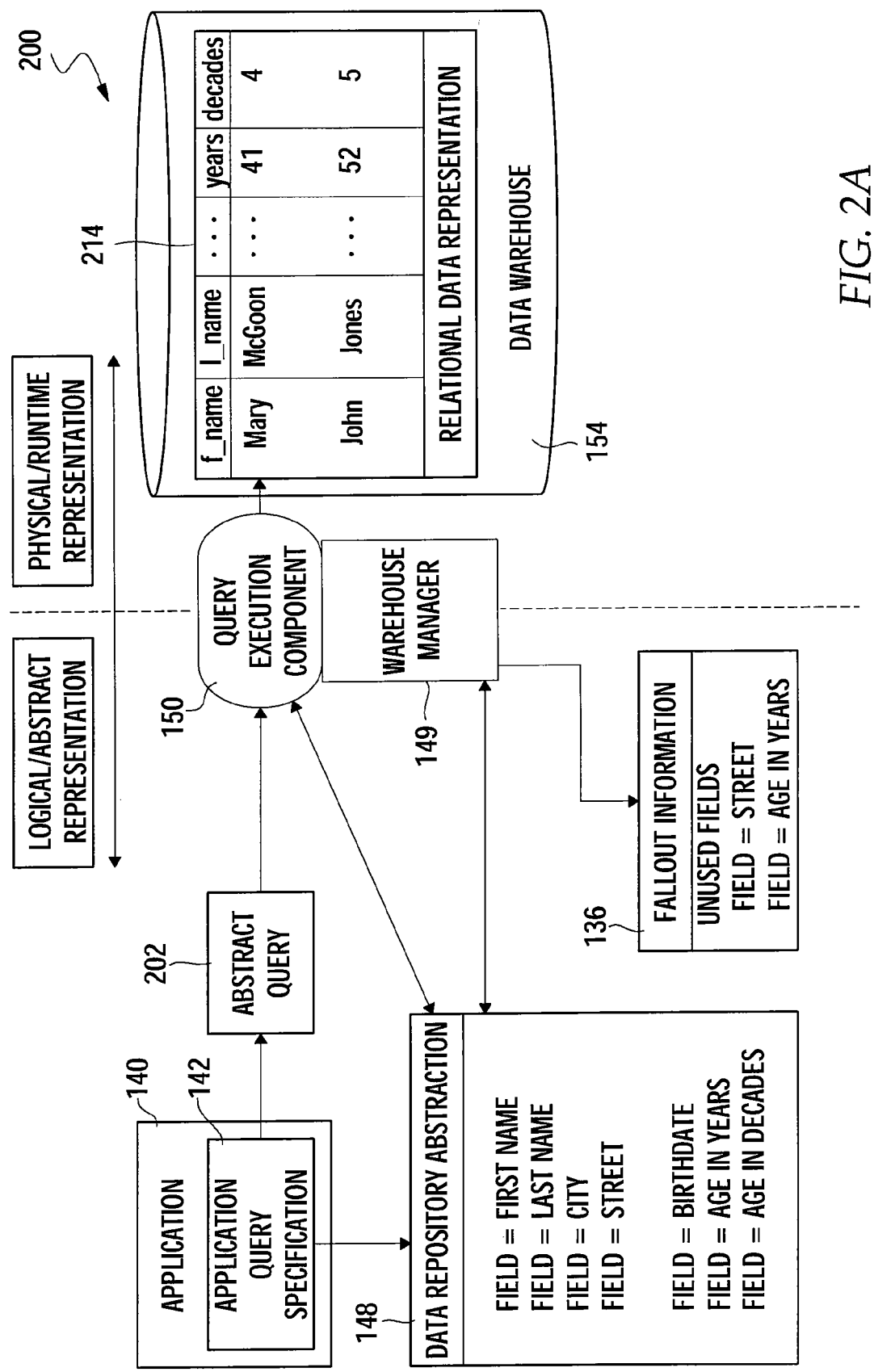
FIG. 2A is a relational view of software components according to one embodiment of the present invention.

FIG. 2A illustrates a relational view of the DRA component 148, fallout manager 149, and query execution component 150, according to one embodiment of the invention. As illustrated, the DRA component 148 includes a set of logical fields corresponding to fields in a physical data representation 214. The physical data representation 214 may be a relational data representation (as shown), such as SQL, for example, XML, or any other type representation. Regardless of the actual physical data representation, a user may issue, via the application 140, an abstract query 202 including query conditions based on the logical fields of the DRA component 148, in order to access data stored in the data warehouse 154.

The query execution component 150 is generally configured to execute the abstract query 202 by transforming (e.g., mapping) the abstract query 202 into a concrete query compatible with the physical data representation 214 of the data warehouse 154. As described in the previously referenced co-pending application Ser. No. 10/083,075, the query execution component 150 may transform the abstract query 202 into the concrete query by mapping the logical fields of the abstract query 202 to the corresponding physical fields of the physical data representation 214, based on mapping information in the DRA component 148. For example, as illustrated in FIG. 2B, the DRA component 148 may include, for each logical field, table and field names indicating a corresponding physical field in the physical data representation 214.

As illustrated, the DRA component 148 may also include, for each logical field, a parameter to store a usage characteristic of the logical field. For example, as shown, a value indicative of the last use of the logical field (e.g., as a number of days) may be stored as the usage characteristic parameter. Alternatively, a time stamp indicative of the last use may be stored in the usage characteristic which may be used to calculate the amount of time has past since the last use from a current time stamp. For some embodiments, usage characteristics may include a frequency with which the logical field is used, for example, as defined by a number of times the logical field has been used in a query for a given period.

In either case, the warehouse manager 149 may decide whether a field in the data warehouse 154 should be updated (e.g., with current data from data sources 157) based on usage of the corresponding logical field, as indicated in the DRA component 148. For example, the warehouse manager 149 may decide that fields that have not been used for over a month (e.g., 30 days) should not be updated. As illustrated in FIG. 2B, "Street" and "Age in Years" fields may have been last used 50 and 60 days ago, respectively. (In other words, medical researchers may have little interest in a patient's street address and their age in years.) Therefore, the warehouse manager 149 may ensure these fields are not updated with data from the data sources, for example, by adding the fields to a list of "Unused Fields" contained in a data object 136 containing "Fallout Information." For some embodiments, the list of unused fields may be sent to a replication manager charged with sending, to the data warehouse 154, updates of data from the data sources 157.

Figure 3:
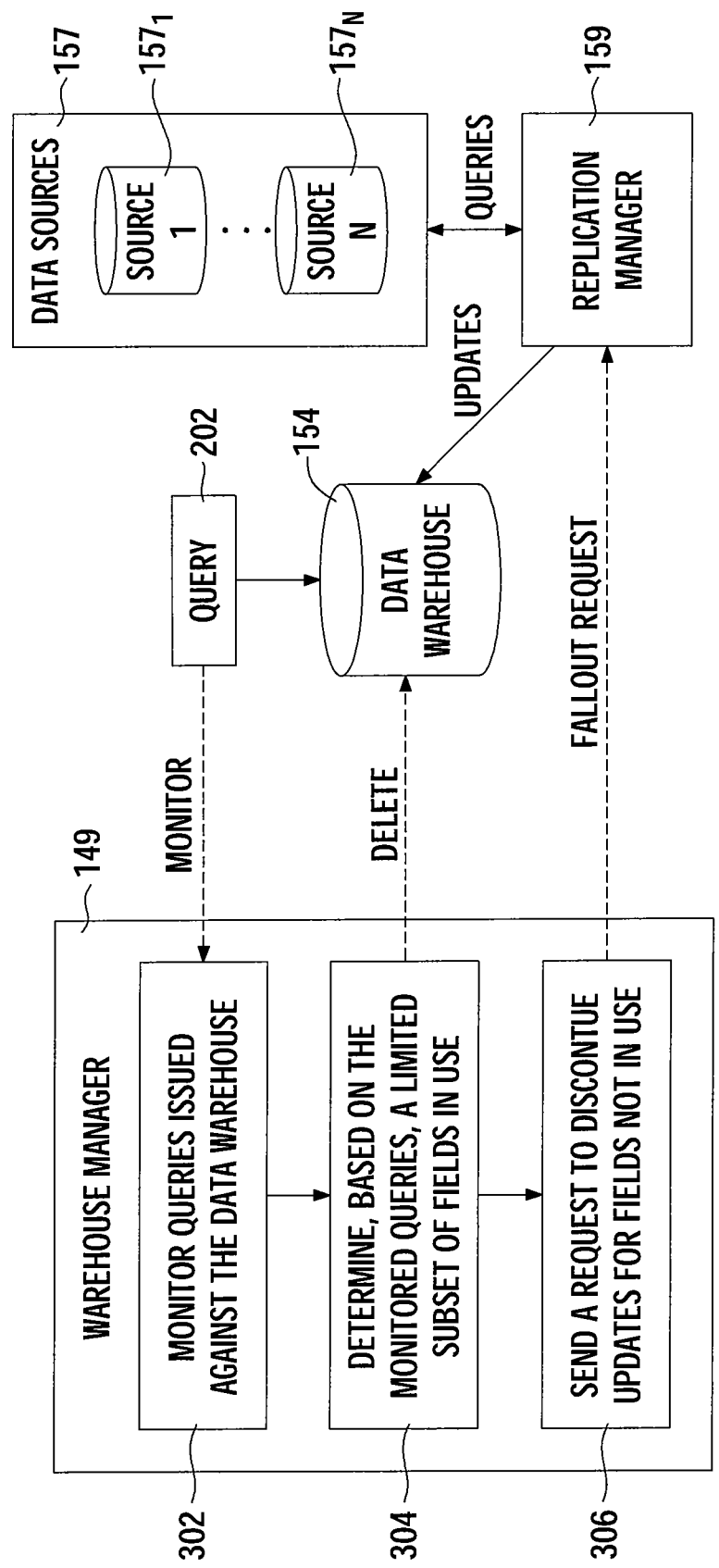
FIG. 3 is an operational view of a data warehouse manager according to one embodiment of the present invention.

For example, FIG. 3 illustrates a relational view of the warehouse manager 149 and a replication manager 159. For some embodiments, the replication manager 159 may be generally configured to automatically query the data sources 157 to gather current data for corresponding fields in the data warehouse 154, and send the gathered data as updates to the data warehouse 154. For other embodiments, the replication manager 159 may send updates in response to requests from the warehouse manager 149. Depending on the implementation, a single replication manager 159 may send updates from multiple data sources 157 or each data source 157 may have a dedicated replication manager 159. In other words, the replication manager 159 may consist of a process, running on one or more of the data sources 157.

For some embodiments, the warehouse manager 149 may be generally configured to perform the illustrated exemplary operations 302-306, in an effort to limit the amount of data replicated from the data sources 157 to the data warehouse 154. The operations begin, at step 302, by monitoring queries issued against the data warehouse 154. The warehouse manager 149 may parse the monitored queries, for example, to generate a list of fields involved in conditions and specified as results for the query. The warehouse manager 149 may then update the usage characteristics for the involved fields contained in the DRA component 148. As an alternative, the query execution component 150 may update the usage characteristics for fields in the DRA component 148, as it issues queries involving those fields. In either case, usage characteristics in the DRA component 148 may be updated each time a query is issued. For embodiments not based on the data abstraction model, usage characteristics may be stored in any suitable data object accessibly by the warehouse manager 149.

Figure 4:
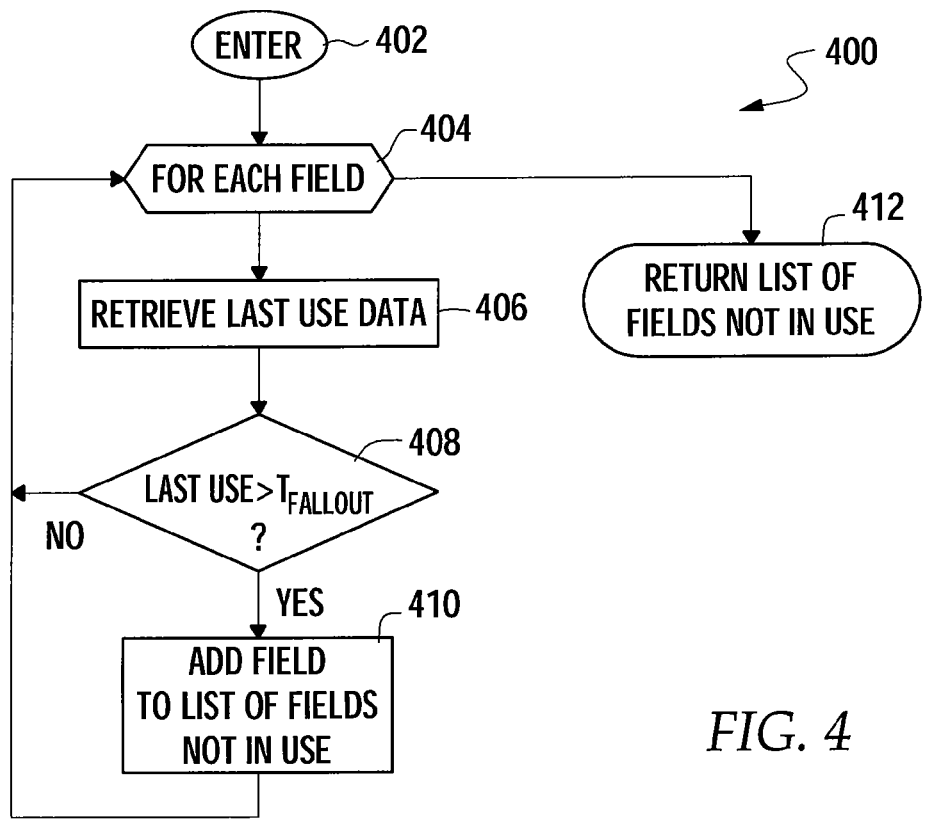
FIG. 4 is a flow chart illustrating exemplary operations for identifying data warehouse fields that are not in use according to aspects of the present invention.

At step 304, the warehouse manager 149 determines which fields are in use, based on the monitored queries. As previously described, the warehouse manager 149 may determine, based on usage characteristics stored in the DRA component 148, whether the field has been used in a predetermined period of time. FIG. 4, described below, illustrates exemplary operations for determining which fields are in use based on the last use characteristic stored in the DRA component 148. As an alternative, the warehouse manager 149 may determine if the field has been used a predetermined number of times within a predetermined period of time.

Figure 5:
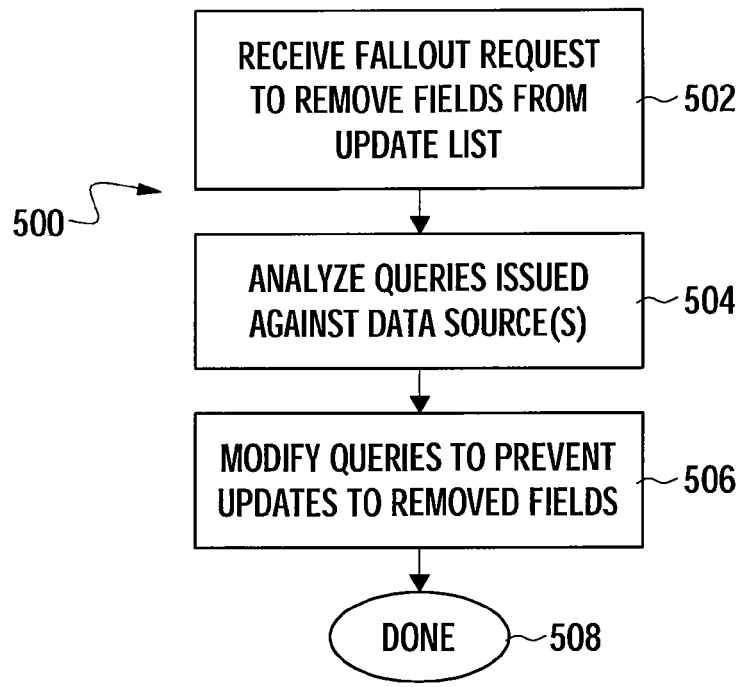
FIG. 5 is a flow chart illustrating exemplary operations for processing a fallout request according to aspects of the present invention.

At step 306, the warehouse manager 149 sends a request to the replication manager 159 to discontinue sending updates for fields not in use, thus reducing the network bandwidth consumed by the updates. FIG. 5, described below, illustrates exemplary operations 500 that may be performed by the replication manager 159 in response to receiving a fallout request. Further, as illustrated in FIG. 3, the warehouse manager 149 may also delete, from the data warehouse 154, fields that are not in use, thus conserving space and reducing the overall storage size of the data warehouse 154.

FIG. 4 illustrates exemplary operations 400 that may be performed by the warehouse manager 149 to determine which fields are (or are not) in use. The operations 400 are entered at step 402, for example, upon entering a periodic maintenance routine performed on the data warehouse 154. At step 404, a loop of operations (406-410) is entered, to be performed for each field (e.g., each field currently in the data warehouse 154), to determine which fields have/have not been used within a predetermined fallout period ($T_{FALLOUT}$).

At step 406, last use data is retrieved for the field. At step 408, a determination is made as to whether the field was used within $T_{FALLOUT}$. For example, if the last use data is stored as a time stamp, the last use (in days) may be calculated by subtracting the last use time stamp from the current time stamp, and compared to $T_{FALLOUT}$. If the field has not been used within $T_{FALLOUT}$, at step 410, the field is added to a list of fields that are not in use (e.g., as shown in the Fallout Information data object 136 of FIG. 3). Once the operations 406-410 have been performed for each field, the list of fields not in use is returned, for example, to be sent to the replication manager 159 in a fallout request.

FIG. 5 illustrates exemplary operations that may be performed by the replication manager 159 in response to receiving the fallout request. At step 502, the replication manager receives the fallout request to remove fields from an update list. As previously described, the replication manager 159 may automatically issue queries against the data sources 157 to gather data for updating the data warehouse 154. At step 504, the replication manager 159 analyzes the queries issued against the data sources 157 (to gather data for updating the data warehouse 154) and, at step 506, the replication manager modifies the queries to prevent updates to removed fields (e.g., fields indicated in the fallout request).

Of course, the operations described in FIG. 4 and FIG. 5 are exemplary only, and may be modified for different embodiments. For example, rather than send the replication manager 159 a fallout request containing a list of fields that are not in use, the warehouse manager may send a fallout request containing a list of fields that are in use. However, if the data warehouse is relatively large (a large number of fields), sending a list of fields that are in use may be prohibitive. Further, as will be described below, maintaining a list of fields that have fallen out may facilitate restoring a field that has previously fallen out in the event there is a renewed interest in the field. In either case, the replication manager 159 may determine a limited number of fields that should be updated, thereby reducing network traffic for the updates. For some embodiments, rather than receiving automatic updates from the replication manager 159, the warehouse manager 149 may (manually) request current data from the data sources 157. Accordingly, rather than send a fallout request specifying fields that have fallen out, the warehouse manager 149 may simply discontinue requesting data for the fields that have fallen out.

Restoring Previously Fallen Out Fields

For some embodiments, even though a field has fallen out and, therefore, the data warehouse 154 may not contain current data for the field (and the field may have been removed from the data warehouse 154), a logical field corresponding to the fallen out field may not be deleted from the DRA component 148. Accordingly, the logical field may still be presented to the user for use in building queries, via the DRA component 148. Therefore, upon occasion, renewed interest in a previously fallen out field may cause that field to be involved in a query. A number of different approaches may be taken to ensure that a query involving a previously fallen out field is properly handled.

Figure 6:
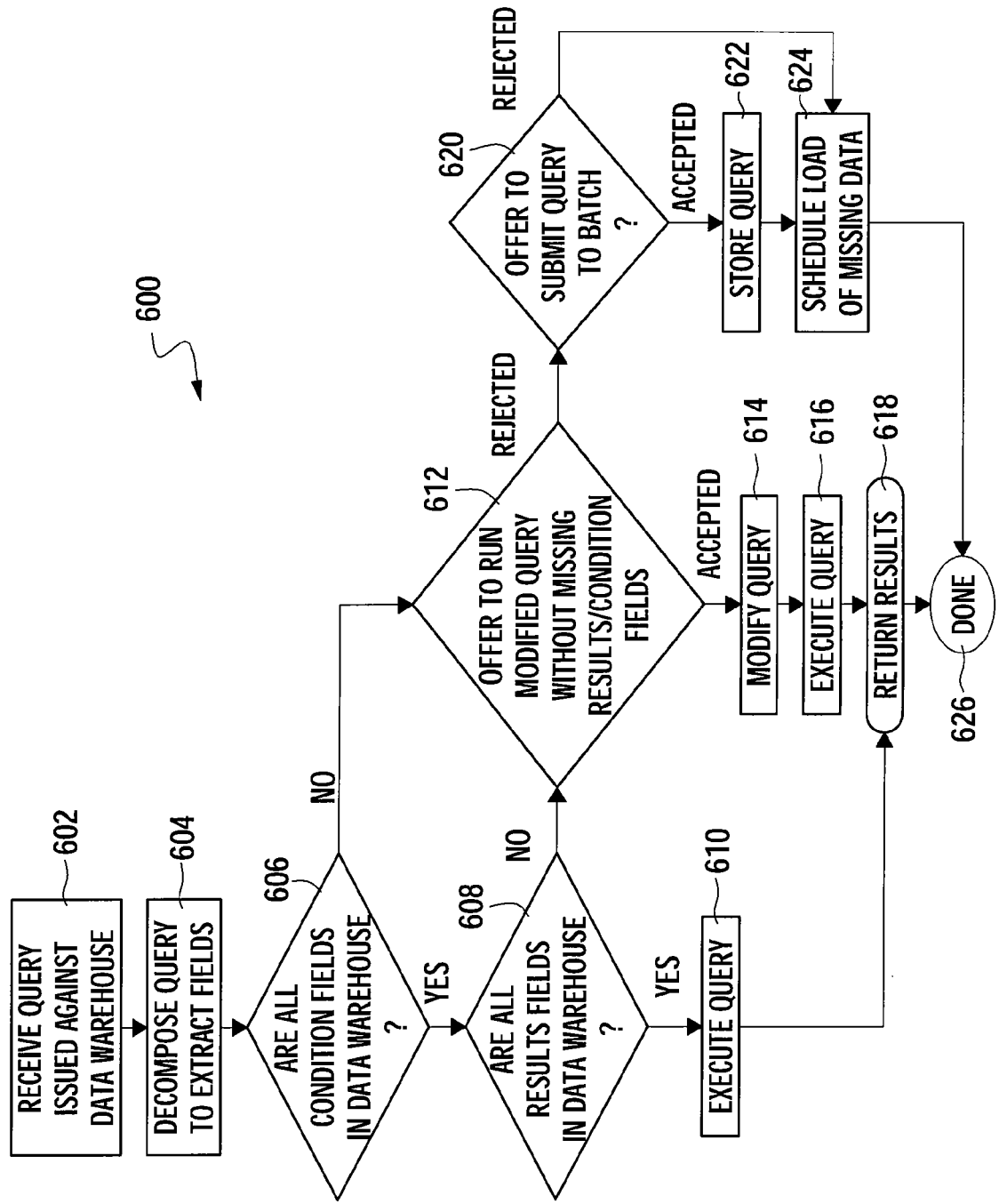
FIG. 6 is a flow chart illustrating exemplary operations for running a query involving previously unused fields according to aspects of the present invention.

For example, FIG. 6 illustrates exemplary operations 600 that may be performed to process a query involving a previously fallen out field according to one approach. The operations begin, at step 602, by receiving the query issued against the data warehouse 154. At step 604, the query is decomposed to extract the fields involved. For example, the query may be decomposed into a conditions component and a results component, and a list of fields for each may be generated.

At step 606, a determination is made as to whether (current data for) all the fields involved in the conditions exist in the data warehouse 149. At step 608, a determination is made as to whether all the fields returned as results are in the data warehouse. The determination may be made, for example, by searching for the conditions fields and results fields in a list of fields that have fallen out (e.g., by searching the Fallout Information data object 136). If current data for both the condition fields and results fields are in the data warehouse, the query is executed (as normal), at step 610, and results are returned to the user, at step 618. On the other hand, if the data warehouse does not have current data for either condition fields or results fields, a decision should be made to determine how to proceed. For example, updating the previously fallen out fields may take a significant amount of time, and a user may not be willing to wait. Therefore, the user may be presented with a number of options for executing the query involving previously fallen out fields.

For example, at step 612, the user may be offered the option to run the query modified to remove involvement of the (data missing from the) previously fallen out field. The offer may be presented to the user, for example, in a GUI screen indicating the query involves one or more previously unused fields. If the offer is accepted, the query is modified, at step 614. At step 616, the modified query is executed and, at step 618, results of the modified query are returned.

If the user chooses not to run a modified query, the user may be offered the option of submitting the query to batch, at step 620. In other words, the query may be stored until data for the fields involved are updated. If the user accepts the offer, the query is stored, at step 622, and an update of data for the previously unused field is scheduled, at step 624. Once the update of the data is complete, the query may be issued from batch. As illustrated, even if the user chooses not to submit the query to batch, an update of data for the previously unused field may still be scheduled, at step 624.

For some embodiments, another option presented to the user may be to issue a fragment of the query (involving the previously fallen out field) directly against the data source 157 containing the current data. The results of this query may then be combined into the remaining portions of the query to be issued against the data warehouse 154. While this option may have performance advantages for a single use, if the field will be queried regularly in the future, it may be best to schedule a load of data for the field. Further, depending on how the query is structured, this approach may not always be possible. Therefore, this approach may be implemented as an optional feature to take advantage of it whenever possible.

CONCLUSION

By limiting the number of data warehouse fields that are updated with current data from one or more data sources, the network bandwidth required to transmit the updates to the data warehouse may be reduced. Further, by removing fields from the data warehouse that are not in use, the size of the data warehouse may be reduced. By allowing data to be loaded into the data warehouse and removed based on the usage of that data, the data warehouse may be continuously modified and reconfigured as needed to satisfy the queries that are run against it.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing a program which, when executed by a processor, performs operations for maintaining a data warehouse having a plurality of fields for storing data from one or more data sources, comprising:
monitoring queries issued against the data warehouse;
updating, based on the monitored queries, usage characteristics of one or more of the plurality of fields in the data warehouse indicative of when the one or more fields were last involved in a query;
issuing, by a management component, a fallout request to one or more of the data sources indicating fields determined not to be used according to the usage characteristics; and
updating, by the management component, the data warehouse with data, from one or more of the data sources, for a limited subset of fields involved in the monitored queries within a first predetermined time period, as indicated by the fields contained in the fallout request.

2. The computer-readable medium of claim 1, wherein the monitored queries are abstract queries comprising one or more logical fields, each corresponding to a physical field of the data warehouse.

3. The computer-readable medium of claim 1, wherein updating the data warehouse comprises sending a request to one or more of the data sources for the data.

4. A database system comprising:
a data warehouse comprising fields of data containing data originating from one or more data sources;
an interface adapted to receive queries issued against the data warehouse; and
a warehouse manager configured to:
monitor the received queries;
update, based on the monitored queries, usage characteristics of one or more of the plurality of fields in the data warehouse indicative of when the one or more fields were last involved in a query;
issue a fallout request to one or more of the data sources indicating fields determined not to be used according to the usage characteristics; and
update the data warehouse with data, from one or more of the data sources, for a limited subset of fields involved in the monitored queries within a first predetermined time period, as indicated by the fields contained in the fallout request.

5. The system of claim 4, wherein the monitored queries are abstract queries comprising one or more logical fields, each corresponding to a physical field of the data warehouse.

6. The system of claim 4, wherein updating the data warehouse comprises sending a request to one or more of the data sources for the data.

7. The database system of claim 4, further comprising at least one replication manager configured to automatically send data from one or more of the data sources to update fields of the data warehouse.

* * * * *